(12) United States Patent
Hoelzer et al.

(10) Patent No.: US 10,614,597 B2
(45) Date of Patent: Apr. 7, 2020

(54) METHOD AND DATA PROCESSING UNIT FOR OPTIMIZING AN IMAGE RECONSTRUCTION ALGORITHM

(71) Applicant: Siemens Healthcare GmbH, Erlangen (DE)

(72) Inventors: Philipp Hoelzer, Bubenreuth (DE); Razvan Ionasec, Nuremberg (DE)

(73) Assignee: SIEMENS HEALTHCARE GMBH, Erlangen (DE)

( * ) Notice: Subject to any disclaimer, the term of this patent is extended or adjusted under 35 U.S.C. 154(b) by 254 days.

(21) Appl. No.: 15/659,707

(22) Filed: Jul. 26, 2017

(65) Prior Publication Data
US 2017/0337713 A1    Nov. 23, 2017

(30) Foreign Application Priority Data
Aug. 12, 2016    (DE) .................. 10 2016 215 109

(51) Int. Cl.
*G06T 11/00* (2006.01)
*G06T 7/11* (2017.01)
*G06T 7/00* (2017.01)

(52) U.S. Cl.
CPC .......... *G06T 11/003* (2013.01); *G06T 7/0012* (2013.01); *G06T 7/11* (2017.01);
(Continued)

(58) Field of Classification Search
None
See application file for complete search history.

(56) References Cited

U.S. PATENT DOCUMENTS 10,074,038 B2 *  9/2018  Hsieh ................. G06K 9/6265
2002/0165837 A1 * 11/2002  Zhang ................. G06K 9/623
                                                                    706/16
(Continued)

FOREIGN PATENT DOCUMENTS

WO    WO 2016009309 A1    1/2016

OTHER PUBLICATIONS

Application of neural networks to lesion detection in SPECT, by Tourassi et al, IEEE pp. 2179-2183, conference Nov. 1991.*
(Continued)

*Primary Examiner* — Vikkram Bali
(74) *Attorney, Agent, or Firm* — Harness, Dickey & Pierce, P.L.C.

(57) ABSTRACT

A method includes provisioning a set of training data sets, each of the training data sets respectively including an acquisition data set; generating a first medical image for each of the training data sets of at least one first subset of the set of training data sets using the image reconstruction algorithm based on a respective acquisition data set; determining an image processing result for each of the respective first medical images using an image processing algorithm based on the respective first medical image; determining image processing information for each of the respective first medical images relating to a quality of the respective image processing result based on the respective image processing result; and optimizing the image reconstruction algorithm based on a first machine learning algorithm, the at least one first subset of the set of training data sets and the image processing information for the respective first medical images.

41 Claims, 7 Drawing Sheets

(52) U.S. Cl.
CPC .. *G06T 11/006* (2013.01); *G06T 2207/10081* (2013.01); *G06T 2207/20081* (2013.01); *G06T 2207/30101* (2013.01)

(56) References Cited

U.S. PATENT DOCUMENTS

2011/0191283 A1* 8/2011 Voigt ................. G06N 5/00 706/54
2015/0178383 A1 6/2015 Corrado

OTHER PUBLICATIONS

Jordan M.I, et.al.: "Machine learning: Trends, perspectives, and prospects", in: Science, vol. 349, Iss. 6245, pp. 255-261.

Floyd C.E. Jr.: "An Artificial Neural Network for SPECT Image Reconstruction"; IEEE Transactions on Medical Imaging; vol. 10 No. 3; pp. 485-487; Sep. 1991; 1991.
Suzuki Keji: "Pixel-BasedMachine Learning inMedical Imaging", in: International Journal of Biomedical Imaging, vol. 2012, pp. 1-19; 2011.
Sajda Paul: "Machine Learning for Detection and Diagnosis of Disease", in: ARI, vol. 14, Nr. 57, pp. 8.1-8.29.
Floyd C. E. Jr. et al: "An Artificial neural Network for Lesion Detection on Single-Photon Emission Computed Tomographic Images"; Investigative Radiology; vol. 27; 1992, pp. 667-672.
Hua Kai-Lung, et.al.: "Computer-aided classification of lung nodules on computed tomography images via deep learning technique", in: OncoTargets and Therapy, vol. 8, pp. 2015-2022; 2015.
Kerr J.P. et al: "Medical Image Processing Utilizing Neural Networks Trained on a Massively Parallel Computer"; Comput. Biol. Med.; vol. 25; 1995; pp. 393-403.; 1995.
German Office Action dated Jul. 18, 2017.

* cited by examiner

METHOD AND DATA PROCESSING UNIT FOR OPTIMIZING AN IMAGE RECONSTRUCTION ALGORITHM

PRIORITY STATEMENT

The present application hereby claims priority under 35 U.S.C. § 119 to German patent application number DE 102016215109.6 filed Aug. 12, 2016, the entire contents of which are hereby incorporated herein by reference.

FIELD

At least one embodiment of the invention generally relates to a method an/or a data processing unit for optimizing an image reconstruction algorithm. At least one embodiment of the invention further generally relates to a method and/or a data processing unit for optimizing an image reconstruction algorithm and an image processing algorithm. At least one embodiment of the invention further generally relates to a medical imaging device, a computer program product and/or a computer-readable medium. At least one embodiment of the invention further generally relates to a use of an image reconstruction algorithm and/or of an image processing algorithm.

BACKGROUND

In radiology, there is a trend toward more quantitative analysis of medical images. Various data-supported image processing algorithms, which can be optimized based on a machine learning algorithm or, in other words, trained, have been developed for processing medical images. Examples of such image processing algorithms are in particular described in [1]-[4]. An image processing algorithm can, in particular, be embodied to identify, segment or remove a structure. The structure can, in particular, be a bone, an organ, for example a liver, or a tissue structure, for example lung nodules. The image processing algorithm can alternatively or additionally be embodied to determine medical information. The medical information can, in particular, relate to the presence of a symptom and/or a disease, for example a pulmonary embolism. The medical information can, for example, indicate whether and/or with what degree of probability a given symptom and/or a given disease is present in the patient.

Image processing algorithms are typically used on medical images that have been reconstructed in the conventional manner. Conventional image reconstruction algorithms are typically optimized for an evaluation performed by a radiologist by observing the medical image with the naked eye. Herein, the quality of the image reconstruction algorithm is in many cases determined based on subjective quality criteria which are applied to the medical images and which are determined or based on abstract physical and/or statistical variables that are only conditionally related to the quality of the medical image with respect to the medical information to be determined therefrom. The determination of the quality of an image reconstruction algorithm by observing the medical image with the naked eye is often subject to restrictions with respect to the available information content. Restrictions of this kind can, for example, be due to the fact that humans are only able to perceive a limited number of images simultaneously or per time unit and human perceptions are influenced by, to some extent, unconscious, assumptions with respect to spatial and time scales, linearity of the value range and noise and artifacts.

SUMMARY

At least one embodiment of the invention provides an alternative to conventional image reconstruction algorithms. The claims relate to further embodiments of the invention.

At least one embodiment of the invention relates to a method for optimizing an image reconstruction algorithm, wherein the method comprises:
provision of a set of training data sets, wherein each training data set in each case comprises an acquisition data set,
generation in each case of a first medical image for each training data set of at least one first subset of the set of training data sets by way of the image reconstruction algorithm based on the respective acquisition data set,
determination in each case of an image processing result for each of the first medical images by way of an image processing algorithm based on the respective first medical image,
determination in each case of image processing information for each of the first medical images relating to the quality of the respective image processing result based on the respective image processing result, and
optimization of the image reconstruction algorithm based on a first machine learning algorithm, the at least one first subset of the set of training data sets and the image processing information for the first medical images.

At least one embodiment of the invention further relates to a method for optimizing an image reconstruction algorithm and an image processing algorithm, wherein the method comprises the following steps:
provision of a set of training data sets, wherein each training data set in each case comprises an acquisition data set,
generation in each case of a first medical image for each training data set of at least one first subset of the set of training data sets by way of the image reconstruction algorithm based on the respective acquisition data set,
determination in each case of an image processing result for each of the first medical images by way of an image processing algorithm based on the respective first medical image,
determination in each case of image processing information for each of the first medical images relating to the quality of the respective image processing result based on the respective image processing result,
optimization of the image reconstruction algorithm based on a first machine learning algorithm, the at least one first subset of the set of training data sets and the image processing information for the first medical images,
generation in each case of a second medical image for each training data set of at least one second subset of the set of training data sets by way of the optimized image reconstruction algorithm based on the respective acquisition data set,
determination in each case of an image processing result for each of the second medical images by way of the image processing algorithm based on the respective second medical image,
determination in each case of image processing information for each of the second medical images relating to the quality of the respective image processing result based on the respective image processing result, and
optimization of the image processing algorithm based on a second machine learning algorithm, the second medical images and the image processing information for the second medical images.

An embodiment of the invention further relates to a data processing unit comprising

- a provisioning unit for the provision of a set of training data sets, wherein each training data set in each case comprises an acquisition data set,
- a first image-generating unit for the generation in each case of a first medical image for each training data set of at least one first subset of the set of training data sets by way of the image reconstruction algorithm based on the respective acquisition data set,
- a first result-determining unit for the determination in each case of an image processing result for each of the first medical images by way of an image processing algorithm based on the respective first medical image,
- a first information-determining unit for the determination in each case of image processing information for each of the first medical images relating to the quality of the respective image processing result based on the respective image processing result, and
- an image reconstruction-optimizing unit for the optimization of the image reconstruction algorithm based on a first machine learning algorithm, the at least one first subset of the set of training data sets and the image processing information for the first medical images.

One embodiment of the invention relates to a data processing unit in accordance with one of the aspects disclosed in this description and/or in the claims further comprising:

- a second image-generating unit for the generation in each case of a second medical image for each training data set of at least one second subset of the set of training data sets by way of the optimized image reconstruction algorithm based on the respective acquisition data set,
- a second result-determining unit for the determination in each case of an image processing result for each of the second medical images by way of the image processing algorithm based on the respective second medical image,
- a second information-determining unit for the determination in each case of image processing information for each of the second medical images relating to the quality of the respective image processing result based on the respective image processing result, and
- an image processing-optimizing unit for the optimization of the image processing algorithm based on a second machine learning algorithm, the second medical images and the image processing information for the second medical images.

One embodiment of the invention relates to a data processing unit in accordance with one of the aspects disclosed in this description and/or in the claims, which is embodied to carry out a method in accordance with one of the embodiments disclosed in this description and/or in the claims.

One embodiment of the invention further relates to a medical imaging device comprising a data processing unit in accordance with one of the aspects disclosed in this description and/or in the claims.

One embodiment of the invention further relates to a computer program product with a computer program, which can be loaded into a memory facility of a data processing system, with program sections for carrying out all the steps of the method in accordance with one of the embodiments disclosed in this description and/or in the claims when the computer program is executed by the data processing system.

One embodiment of the invention further relates to a computer-readable medium on which program sections that can be read-in and executed by a data processing system are stored in order to carry out all the steps of the method in accordance with one of the embodiments disclosed in this description and/or in the claims, when the program sections are executed by the data processing system.

One embodiment of the invention further relates to a use of an image reconstruction algorithm, which has been optimized in accordance with a method in accordance with one of the embodiments disclosed in this description and/or in the claims, for the generation of a medical image based on an acquisition data set.

One embodiment of the invention further relates to a use of an image reconstruction algorithm and an image processing algorithm, which has been optimized in accordance with a method in accordance with one of the embodiments disclosed in this description and/or in the claims, for the determination of an image processing result based on an acquisition data set,

- wherein the acquisition data set is provided,
- wherein a medical image is generated by way of the image reconstruction algorithm based on the acquisition data set,
- wherein the image processing result is determined by way of the image processing algorithm based on the medical image.

BRIEF DESCRIPTION OF THE DRAWINGS

The following explains selected embodiments with reference to the attached figures. The depiction in the figures is schematic, greatly simplified and not necessarily true-to-scale.

In the figures.

DETAILED DESCRIPTION OF THE EXAMPLE EMBODIMENTS

Figure 1:
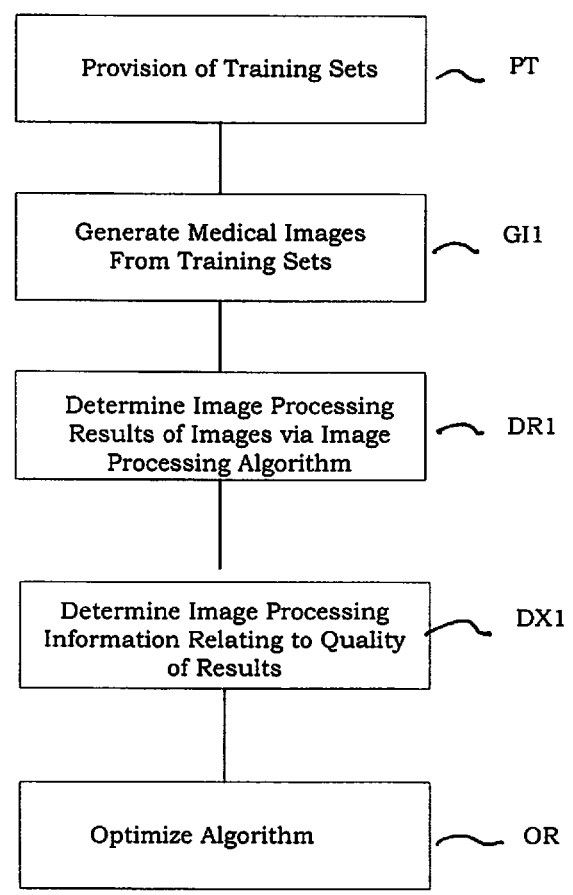
FIG. 1 shows a flow diagram of a method for optimizing an image reconstruction algorithm according to one embodiment of the invention.

The drawings are to be regarded as being schematic representations and elements illustrated in the drawings are not necessarily shown to scale. Rather, the various elements are represented such that their function and general purpose become apparent to a person skilled in the art. Any connection or coupling between functional blocks, devices, components, or other physical or functional units shown in the drawings or described herein may also be implemented by an indirect connection or coupling. A coupling between components may also be established over a wireless connection. Functional blocks may be implemented in hardware, firmware, software, or a combination thereof.

Various example embodiments will now be described more fully with reference to the accompanying drawings in which only some example embodiments are shown. Specific structural and functional details disclosed herein are merely representative for purposes of describing example embodiments. Example embodiments, however, may be embodied in various different forms, and should not be construed as being limited to only the illustrated embodiments. Rather, the illustrated embodiments are provided as examples so that this disclosure will be thorough and complete, and will fully convey the concepts of this disclosure to those skilled in the art. Accordingly, known processes, elements, and techniques, may not be described with respect to some example embodiments. Unless otherwise noted, like reference characters denote like elements throughout the attached drawings and written description, and thus descriptions will not be repeated. The present invention, however, may be embodied in many alternate forms and should not be construed as limited to only the example embodiments set forth herein.

It will be understood that, although the terms first, second, etc. may be used herein to describe various elements, components, regions, layers, and/or sections, these elements, components, regions, layers, and/or sections, should not be limited by these terms. These terms are only used to distinguish one element from another. For example, a first element could be termed a second element, and, similarly, a second element could be termed a first element, without departing from the scope of example embodiments of the present invention. As used herein, the term "and/or," includes any and all combinations of one or more of the associated listed items. The phrase "at least one of" has the same meaning as "and/or".

Spatially relative terms, such as "beneath," "below," "lower," "under," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below," "beneath," or "under," other elements or features would then be oriented "above" the other elements or features. Thus, the example terms "below" and "under" may encompass both an orientation of above and below. The device may be otherwise oriented (rotated 90 degrees or at other orientations) and the spatially relative descriptors used herein interpreted accordingly. In addition, when an element is referred to as being "between" two elements, the element may be the only element between the two elements, or one or more other intervening elements may be present.

Spatial and functional relationships between elements (for example, between modules) are described using various terms, including "connected," "engaged," "interfaced," and "coupled." Unless explicitly described as being "direct," when a relationship between first and second elements is described in the above disclosure, that relationship encompasses a direct relationship where no other intervening elements are present between the first and second elements, and also an indirect relationship where one or more intervening elements are present (either spatially or functionally) between the first and second elements. In contrast, when an element is referred to as being "directly" connected, engaged, interfaced, or coupled to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting of example embodiments of the invention. As used herein, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Also, the term "exemplary" is intended to refer to an example or illustration.

When an element is referred to as being "on," "connected to," "coupled to," or "adjacent to," another element, the element may be directly on, connected to, coupled to, or adjacent to, the other element, or one or more other intervening elements may be present. In contrast, when an element is referred to as being "directly on," "directly connected to," "directly coupled to," or "immediately adjacent to," another element there are no intervening elements present.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Before discussing example embodiments in more detail, it is noted that some example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Specific structural and functional details disclosed herein are merely representative for purposes of describing example embodiments of the present invention. This invention may, however, be embodied in many alternate forms and should not be construed as limited to only the embodiments set forth herein.

Units and/or devices according to one or more example embodiments may be implemented using hardware, software, and/or a combination thereof. For example, hardware devices may be implemented using processing circuitry such as, but not limited to, a processor, Central Processing Unit (CPU), a controller, an arithmetic logic unit (ALU), a digital signal processor, a microcomputer, a field programmable gate array (FPGA), a System-on-Chip (SoC), a programmable logic unit, a microprocessor, or any other device capable of responding to and executing instructions in a defined manner. Portions of the example embodiments and corresponding detailed description may be presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" of "displaying" or the like, refer to the action and processes of a computer system, or similar electronic computing device/ hardware, that manipulates and transforms data represented as physical, electronic quantities within the computer system's registers and memories into other data similarly represented as physical quantities within the computer system memories or registers or other such information storage, transmission or display devices.

In this application, including the definitions below, the term 'module' or the term 'controller' may be replaced with the term 'circuit.' The term 'module' may refer to, be part of, or include processor hardware (shared, dedicated, or group) that executes code and memory hardware (shared, dedicated, or group) that stores code executed by the processor hardware.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

For example, when a hardware device is a computer processing device (e.g., a processor, Central Processing Unit (CPU), a controller, an arithmetic logic unit (ALU), a digital signal processor, a microcomputer, a microprocessor, etc.), the computer processing device may be configured to carry out program code by performing arithmetical, logical, and input/output operations, according to the program code. Once the program code is loaded into a computer processing device, the computer processing device may be programmed to perform the program code, thereby transforming the computer processing device into a special purpose computer processing device. In a more specific example, when the program code is loaded into a processor, the processor becomes programmed to perform the program code and operations corresponding thereto, thereby transforming the processor into a special purpose processor.

Software and/or data may be embodied permanently or temporarily in any type of machine, component, physical or virtual equipment, or computer storage medium or device, capable of providing instructions or data to, or being interpreted by, a hardware device. The software also may be distributed over network coupled computer systems so that the software is stored and executed in a distributed fashion. In particular, for example, software and data may be stored by one or more computer readable recording mediums, including the tangible or non-transitory computer-readable storage media discussed herein.

Even further, any of the disclosed methods may be embodied in the form of a program or software. The program or software may be stored on a non-transitory computer readable medium and is adapted to perform any one of the aforementioned methods when run on a computer device (a device including a processor). Thus, the non-transitory, tangible computer readable medium, is adapted to store information and is adapted to interact with a data processing facility or computer device to execute the program of any of the above mentioned embodiments and/or to perform the method of any of the above mentioned embodiments.

Example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order.

According to one or more example embodiments, computer processing devices may be described as including various functional units that perform various operations and/or functions to increase the clarity of the description. However, computer processing devices are not intended to be limited to these functional units. For example, in one or more example embodiments, the various operations and/or functions of the functional units may be performed by other ones of the functional units. Further, the computer processing devices may perform the operations and/or functions of the various functional units without sub-dividing the operations and/or functions of the computer processing units into these various functional units.

Units and/or devices according to one or more example embodiments may also include one or more storage devices. The one or more storage devices may be tangible or non-transitory computer-readable storage media, such as random access memory (RAM), read only memory (ROM), a permanent mass storage device (such as a disk drive), solid state (e.g., NAND flash) device, and/or any other like data storage mechanism capable of storing and recording data. The one or more storage devices may be configured to store computer programs, program code, instructions, or some combination thereof, for one or more operating systems and/or for implementing the example embodiments described herein. The computer programs, program code, instructions, or some combination thereof, may also be loaded from a separate computer readable storage medium into the one or more storage devices and/or one or more computer processing devices using a drive mechanism. Such separate computer readable storage medium may include a Universal Serial Bus (USB) flash drive, a memory stick, a Blu-ray/DVD/CD-ROM drive, a memory card, and/or other like computer readable storage media. The computer programs, program code, instructions, or some combination thereof, may be loaded into the one or more storage devices and/or the one or more computer processing devices from a remote data storage device via a network interface, rather than via a local computer readable storage medium. Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network. The remote computing system may transfer and/or distribute the computer programs, program code, instructions, or some combination thereof, via a wired interface, an air interface, and/or any other like medium.

The one or more hardware devices, the one or more storage devices, and/or the computer programs, program code, instructions, or some combination thereof, may be specially designed and constructed for the purposes of the example embodiments, or they may be known devices that are altered and/or modified for the purposes of example embodiments.

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as a computer processing device or processor; however, one skilled in the art will appreciate that a hardware device may include multiple processing elements or processors and multiple types of processing elements or processors. For example, a hardware device may include multiple processors or a processor and a controller. In addition, other processing configurations are possible, such as parallel processors.

The computer programs include processor-executable instructions that are stored on at least one non-transitory computer-readable medium (memory). The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc. As such, the one or more processors may be configured to execute the processor executable instructions.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

Further, at least one embodiment of the invention relates to the non-transitory computer-readable storage medium including electronically readable control information (processor executable instructions) stored thereon, configured in such that when the storage medium is used in a controller of a device, at least one embodiment of the method may be carried out.

The computer readable medium or storage medium may be a built-in medium installed inside a computer device main body or a removable medium arranged so that it can be separated from the computer device main body. The term computer-readable medium, as used herein, does not encompass transitory electrical or electromagnetic signals propagating through a medium (such as on a carrier wave); the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices); volatile memory devices (including, for example static random access memory devices or a dynamic random access memory devices); magnetic storage media (including, for example an analog or digital magnetic tape or a hard disk drive); and optical storage media (including, for example a CD, a DVD, or a Blu-ray Disc). Examples of the media with a built-in rewriteable non-volatile memory, include but are not limited to memory cards; and media with a built-in ROM, including but not limited to ROM cassettes; etc. Furthermore, various information regarding stored images, for example, property information, may be stored in any other form, or it may be provided in other ways.

The term code, as used above, may include software, firmware, and/or microcode, and may refer to programs, routines, functions, classes, data structures, and/or objects.

Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

Shared memory hardware encompasses a single memory device that stores some or all code from multiple modules. Group memory hardware encompasses a memory device that, in combination with other memory devices, stores some or all code from one or more modules.

The term memory hardware is a subset of the term computer-readable medium. The term computer-readable medium, as used herein, does not encompass transitory electrical or electromagnetic signals propagating through a medium (such as on a carrier wave); the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices); volatile memory devices (including, for example static random access memory devices or a dynamic random access memory devices); magnetic storage media (including, for example an analog or digital magnetic tape or a hard disk drive); and optical storage media (including, for example a CD, a DVD, or a Blu-ray Disc). Examples of the media with a built-in rewriteable non-volatile memory, include but are not limited to memory cards; and media with a built-in ROM, including but not limited to ROM cassettes; etc. Furthermore, various information regarding stored images, for example, property information, may be stored in any other form, or it may be provided in other ways.

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

Although described with reference to specific examples and drawings, modifications, additions and substitutions of example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

At least one embodiment of the invention relates to a method for optimizing an image reconstruction algorithm, wherein the method comprises:

provision of a set of training data sets, wherein each training data set in each case comprises an acquisition data set, generation in each case of a first medical image for each training data set of at least one first subset of the set of training data sets by way of the image reconstruction algorithm based on the respective acquisition data set, determination in each case of an image processing result for each of the first medical images by way of an image processing algorithm based on the respective first medical image, determination in each case of image processing information for each of the first medical images relating to the quality of the respective image processing result based on the respective image processing result, and optimization of the image reconstruction algorithm based on a first machine learning algorithm, the at least one first subset of the set of training data sets and the image processing information for the first medical images.

At least one embodiment of the invention further relates to a method for optimizing an image reconstruction algorithm and an image processing algorithm, wherein the method comprises the following steps:

provision of a set of training data sets, wherein each training data set in each case comprises an acquisition data set, generation in each case of a first medical image for each training data set of at least one first subset of the set of training data sets by way of the image reconstruction algorithm based on the respective acquisition data set, determination in each case of an image processing result for each of the first medical images by way of an image processing algorithm based on the respective first medical image, determination in each case of image processing information for each of the first medical images relating to the quality of the respective image processing result based on the respective image processing result, optimization of the image reconstruction algorithm based on a first machine learning algorithm, the at least one first subset of the set of training data sets and the image processing information for the first medical images, generation in each case of a second medical image for each training data set of at least one second subset of the set of training data sets by way of the optimized image reconstruction algorithm based on the respective acquisition data set, determination in each case of an image processing result for each of the second medical images by way of the image processing algorithm based on the respective second medical image, determination in each case of image processing information for each of the second medical images relating to the quality of the respective image processing result based on the respective image processing result, and optimization of the image processing algorithm based on a second machine learning algorithm, the second medical images and the image processing information for the second medical images.

One embodiment of the invention relates to a method, wherein a plurality of iteration steps is performed, wherein, with the first iteration step and with each further iteration step, in each case all the steps of a method for the optimization of the image reconstruction algorithm and the image processing algorithm are performed in accordance with one of the aspects disclosed in this description and/or in the claims, wherein with each further iteration step, the image reconstruction algorithm is further optimized proceeding from the image reconstruction algorithm optimized in the preceding iteration step based on the image processing algorithm optimized in the preceding iteration step and the image processing algorithm is further optimized proceeding from the image processing algorithm optimized in the preceding iteration step based on the image reconstruction algorithm that was previously further optimized in the respective further iteration step.

One embodiment of the invention relates to a method in accordance with one of the aspects disclosed in this description and/or in the claims
wherein the image processing result and/or the reference image processing result relates to medical information.

One embodiment of the invention relates to a method in accordance with one of the aspects disclosed in this description and/or in the claims,
wherein the image processing algorithm comprises an algorithm for identifying a structure in the patient based on the first medical image and/or based on the second medical image and/or
wherein the image processing algorithm comprises an algorithm for the determination of a physiological parameter in a patient based on the first medical image and/or based on the second medical image.

One embodiment of the invention relates to a method in accordance with one of the aspects disclosed in this description and/or in the claims,
wherein each training data set of the set of training data sets in each case further comprises a reference image processing result,
wherein the image processing information for each of the first medical images and/or the image processing information for each of the second medical images is determined based on the respective image processing result and the respective reference image processing result.

One embodiment of the invention relates to a method in accordance with one of the aspects disclosed in this description and/or in the claims,
wherein the image processing algorithm comprises an algorithm for segmenting a structure in the first medical image and/or in the second medical image and/or
wherein the reference image processing result relates to an assignment of image data points of the first medical image to a structure in the first medical image and/or an assignment of image data points of the second medical image to a structure in the second medical image.

One embodiment of the invention relates to a method in accordance with one of the aspects disclosed in this description and/or in the claims,
wherein the reference image processing result in each case comprises a map with which image data points of the first medical image can be assigned to a structure in the first medical image and/or image data points of the second medical image can be assigned to a structure in the second medical image.

One embodiment of the invention relates to a method in accordance with one of the aspects disclosed in this description and/or in the claims,
wherein the image processing information relates to a measure for an inaccuracy of the image processing result and/or a measure for a deviation of the image processing result from the respective reference image processing result.

One embodiment of the invention relates to a method in accordance with one of the aspects disclosed in this description and/or in the claims,
wherein the image processing information is determined based on a Dice coefficient.

One embodiment of the invention relates to a method in accordance with one of the aspects disclosed in this description and/or in the claims,
wherein the image reconstruction algorithm is optimized based on a first item of cumulated image processing information determined based on the image processing information for the first medical images and/or
wherein the image processing algorithm is optimized based on a second item of cumulated image processing information which is determined based on the image processing information for the second medical images.

One embodiment of the invention relates to a method in accordance with one of the aspects disclosed in this description and/or in the claims,
wherein the image reconstruction algorithm is optimized in that an optimized image reconstruction parameter set of the image reconstruction algorithm is determined and/or
wherein the image processing algorithm is optimized in that an optimized image reconstruction parameter set of the image processing algorithm is determined.

One embodiment of the invention relates to a method in accordance with one of the aspects disclosed in this description and/or in the claims,
wherein the set of training data sets comprises training data sets in each case comprising an examination parameter set selected from the group including an acquisition parameter set, an injection parameter set, a patient parameter set, an external image parameter set and combinations thereof.

One embodiment of the invention relates to a method in accordance with one of the aspects disclosed in this description and/or in the claims,
wherein the image reconstruction algorithm and/or the image processing algorithm is optimized based on the examination parameter set and/or
wherein, during the optimization of the image reconstruction algorithm and/or during the optimization of the image processing algorithm, an optimal region is determined for at least one examination parameter of the examination parameter set based on the first machine learning algorithm, the set of training data sets and the image processing information for the first medical images.

An embodiment of the invention further relates to a data processing unit comprising
a provisioning unit for the provision of a set of training data sets, wherein each training data set in each case comprises an acquisition data set,
a first image-generating unit for the generation in each case of a first medical image for each training data set of at least one first subset of the set of training data sets by way of the image reconstruction algorithm based on the respective acquisition data set,
a first result-determining unit for the determination in each case of an image processing result for each of the first medical images by way of an image processing algorithm based on the respective first medical image,
a first information-determining unit for the determination in each case of image processing information for each of the first medical images relating to the quality of the respective image processing result based on the respective image processing result, and
an image reconstruction-optimizing unit for the optimization of the image reconstruction algorithm based on a first machine learning algorithm, the at least one first subset of the set of training data sets and the image processing information for the first medical images.

One embodiment of the invention relates to a data processing unit in accordance with one of the aspects disclosed in this description and/or in the claims further comprising:
- a second image-generating unit for the generation in each case of a second medical image for each training data set of at least one second subset of the set of training data sets by way of the optimized image reconstruction algorithm based on the respective acquisition data set,
- a second result-determining unit for the determination in each case of an image processing result for each of the second medical images by way of the image processing algorithm based on the respective second medical image,
- a second information-determining unit for the determination in each case of image processing information for each of the second medical images relating to the quality of the respective image processing result based on the respective image processing result, and
- an image processing-optimizing unit for the optimization of the image processing algorithm based on a second machine learning algorithm, the second medical images and the image processing information for the second medical images.

One embodiment of the invention relates to a data processing unit in accordance with one of the aspects disclosed in this description and/or in the claims, which is embodied to carry out a method in accordance with one of the embodiments disclosed in this description and/or in the claims.

An embodiment of the invention further relates to a medical imaging device comprising a data processing unit in accordance with one of the aspects disclosed in this description and/or in the claims.

An embodiment of the invention further relates to a computer program product with a computer program, which can be loaded into a memory facility of a data processing system, with program sections for carrying out all the steps of the method in accordance with one of the aspects disclosed in this description and/or in the claims when the computer program is executed by the data processing system.

An embodiment of the invention further relates to a computer-readable medium on which program sections that can be read-in and executed by a data processing system are stored in order to carry out all the steps of the method in accordance with one of the aspects disclosed in this description and/or in the claims, when the program sections are executed by the data processing system.

An embodiment of the invention further relates to a use of an image reconstruction algorithm, which has been optimized in accordance with a method in accordance with one of the aspects disclosed in this description and/or in the claims, for the generation of a medical image based on an acquisition data set.

An embodiment of the invention further relates to a use of an image reconstruction algorithm and an image processing algorithm, which has been optimized in accordance with a method in accordance with one of the aspects disclosed in this description and/or in the claims, for the determination of an image processing result based on an acquisition data set,
wherein the acquisition data set is provided,
wherein a medical image is generated by way of the image reconstruction algorithm based on the acquisition data set,
wherein the image processing result is determined by way of the image processing algorithm based on the medical image.

The inventors have recognized that an image reconstruction algorithm optimized in the conventional manner performed by a radiologist by observing the medical image with the naked eye is not always optimal with respect to the image processing result determined by way of an image processing algorithm based on the medical image. The inventors suggest that an image reconstruction algorithm is optimized such that the medical images generated via the image reconstruction algorithm are optimized for use as input for an image processing algorithm. In this way, it is possible, based on a medical image that was generated with the optimized image processing algorithm according to an embodiment of the invention, to determine an image processing result which is improved compared to an image processing result that was determined based on a medical image reconstructed in the conventional manner.

The training data sets can be provided with the aid of information from previously performed medical examinations, from synthetic data and and/or from medical publications and/or study results. A training data set and/or a part of the training data set, for example the acquisition data set and/or the reference image processing result, can, for example, be provided in that the training data set and/or the part of the training data set is generated via a medical imaging device and/or loaded from a medical database. The at least one first subset of the set of training data sets can, in particular, be a first subset of the set of training data sets or the set of training data sets. The at least one second subset of the set of training data sets can, in particular, be a second subset of the set of training data sets or the set of training data sets. The first subset of the set of training data sets and the second subset of the set of training data sets can, for example, be identical or comprise a common intersection of training data sets or no common intersection of training data sets. Different iteration steps from the plurality of iteration steps can, for example, be the basis for the first subset of the set of training data sets or, for example, different first subsets of the set of training data sets. Different iteration steps from the plurality of iteration steps can, for example, be the basis for the second subset of the set of training data sets or, for example, different second subsets of the set of training data sets.

The second medical images can be generated based on the acquisition data sets of the set of training data sets and/or based on further acquisition data sets of a further set of training data sets. The features of the set of training data sets, which the person skilled in the art will derive from the total content of this application, can be transferred analogously to the further set of training data sets.

In particular, the set of training data sets can be present in the form of a set of training pairs, wherein each training pair of the set of training pairs in each case comprises training input comprising the acquisition data set and training output comprising the reference image processing result.

The acquisition data set can, for example, also be understood to be a series of temporally successive acquisition partial data sets. The medical image can, for example, also be understood to mean a series of temporally successive partial medical images. In particular, the acquisition data set can be a projection data set and/or comprise a projection data set. In particular, the acquisition data set can be a k-space data set and/or comprise a k-space data set. It is in particular possible, for each training data set of the set of training data sets, for the acquisition data set of the respective training data set to be a projection data set and/or comprise a projection data set. It is in particular possible, for each training data set of the set of training data sets, for the acquisition data set of the respective training data set to be a k-space data set and/or comprise a k-space data set.

A projection data set typically comprises projection data points with in each case at least one projection data point value, wherein the at least one projection data point value is a measure for the attenuation of radiation, wherein the attenuation of the radiation relates to a radiation path that can be or is assigned to the respective projection data point. The radiation path can, in particular, extend from a radiation source to a detector element and/or to a group of detector elements. In particular, a radiation path can be defined by an arrangement of the radiation source and the detector element and/or by an arrangement of the radiation source and the group of detector elements relative to an examination region and/or relative to a region of a patient. In particular, a segment of the radiation path can extend through an examination region and/or through a region of a patient.

A medical image typically comprises image points with in each case at least one image point value, wherein the at least one image point value is a measure for the attenuation of radiation, wherein the attenuation of the radiation relates to a volume element that can be or is assigned to the image point. The volume element can, in particular, be located in an examination region and/or in a region of a patient.

The projection data set is typically stored in a projection data space. The medical image is typically stored in an image data space. In particular, it is possible to reconstruct a medical image based on the projection data set by way of filtered back projection.

The reference image processing result can, for example, be present in the form of a diagnosis and/or a prediction, in the form of a segmentation result, in particular in the form of a contour of a structure, in the form of a classification, in particular of a tumor, in particular as benign or malignant, in the form of quantification, in particular in the form of a determination of a stage and/or a determination of a degree of spreading, for example of a tumor ("tumor staging").

The image processing result can, for example, comprise a result of detection of lung nodules, FFR simulation, a CAD routine, in particular patient-specific simulation, outlining, segmentation, calcium scoring or the like and combinations thereof. The image processing result can, for example, comprise a calculated FFR value ("computed fractional flow reserve"), a measure for vulnerability in connection with plaque ("plaque vulnerability") a measure for a risk and/or for the presence of cancer, in particular lung cancer, a measure for a risk and/or for the presence of a disease, in particular chronic obstructive pulmonary disease. The image processing result can, in particular, be understood to be a patient-specific image processing result.

The image processing algorithm can, for example, comprise CAD routines, in particular for the detection of lung nodules.

The image processing information can, in particular, be understood to be a measure for the quality of the image processing result and/or a measure for the suitability of the image processing result for a determination of an examination result based on the image processing result. The image processing information can, for example, be a measure for the inaccuracy of a diagnosis and/or a prediction, for example of lung cancer. The image processing information in particular relates to a measure for the inaccuracy of the image processing result when it relates to a measure for the accuracy of the image processing result. Herein, high inaccuracy is equivalent to low accuracy and vice versa. The image processing information in particular relates to a measure for a deviation of the image processing result from the respective reference image processing result when it relates to a measure for the conformity of the image processing result with the respective reference image processing result. Herein, a major deviation is equivalent to a low degree of conformity and vice versa.

It is in particular possible to provide a class of image reconstruction algorithms comprising the image reconstruction algorithm to be optimized. The image reconstruction algorithms in the class of image reconstruction algorithms can, for example, differ from one another with respect to the values of the image reconstruction parameters of the respective image reconstruction parameter set. The image reconstruction algorithm can, for example, be optimized in that a more suitable image reconstruction algorithm, in particular with an optimized image reconstruction parameter set, is selected from the class of image reconstruction algorithms. The image reconstruction algorithm can, for example, be an iterative image reconstruction algorithm. In particular, the class of image reconstruction algorithms can comprise image reconstruction algorithms that differ with respect to the type of medical image generated. Possible types of medical images are, for example: a monoenergetic medical image, a multispectral medical image, a medical image depicting the basic material of a decomposed material, a perfusion image or the like. In particular, during the optimization of the image reconstruction algorithm, it is possible to select a more suitable type of medical images. The image reconstruction algorithm can, for example, be optimized in that a more suitable image reconstruction algorithm, in particular with an optimized image reconstruction parameter set, is selected from the class of image reconstruction algorithms, wherein a medical image of the selected type of medical images is generated with the selected image reconstruction algorithm.

It is in particular possible to provide a class of image processing algorithms comprising the image processing algorithm to be optimized. The image processing algorithms in the class of image processing algorithms can, for example, differ from one another with respect to the values of the Image processing parameters of the respective image reconstruction parameter set. The image processing algorithm can, for example, be optimized in that a more suitable image processing algorithm, in particular with an optimized image reconstruction parameter set, is selected from the class of image processing algorithms.

In particular, the class of image processing algorithms can comprise image processing algorithms, which differ with respect to the type of the underlying medical image. It is in particular possible, during the optimization of the image processing algorithm, to select a more suitable type of medical images. The image processing algorithm can, for example, be optimized in that a more suitable image processing algorithm, in particular with an optimized image reconstruction parameter set, is selected from the class of image processing algorithms, wherein an image processing result based on a medical image of the selected type of medical images is determined with the selected image processing algorithm.

It can be in particular be provided, that the method further comprises the following step:
optimization of the image processing algorithm based on the second machine learning algorithm, the first medical images and the image processing information for the first medical images.

It is in particular possible, with each further iteration step, for the image reconstruction algorithm to be further optimized proceeding from the image reconstruction algorithm optimized in the preceding iteration step based on the image processing algorithm optimized in the preceding iteration step in accordance with the steps of an embodiment of the method. It is in particular possible, with each further iteration step, for the image processing algorithm to be further optimized proceeding from the image processing algorithm optimized in the preceding iteration step based on the image reconstruction algorithm that was previously further optimized in the respective further iteration step in accordance with the steps of an embodiment of the method.

The map can, for example, be a binary map with which image data points of the first medical image are assigned either to a structure in the first medical image or to a background of the structure in the first medical image and/or with which image data points of the first medical image are assigned either to a structure in the second medical image or to a background of the structure in the second medical image.

An image processing result relating to the identification of a structure in the patient can, for example, be a binary result indicating whether the structure is present in the patient or not. An image processing result relating to the identification of a structure in the patient can, for example, comprise one or more probability indicators, indicating, for example, the probability with which an identified structure is to be assigned to a given class of structures. During the determination of the physiological parameter it is, for example, possible to determine a spatially resolved and/or time-resolved distribution of the physiological parameter, in particular in a structure of the patient. One example of this is the distribution of FFR values in a coronary vessel and/or in a coronary vessel tree.

The quality of the image processing result of the first and/or second medical image can, in particular, be dependent upon image parameters of the first and/or second medical image. The image parameters of the first and/or second medical image, which can, for example, relate to the noise and/or the resolution, can, in particular, be dependent upon the image reconstruction parameter set and/or the examination parameter set, in particular the acquisition parameter set.

The image reconstruction parameter set can, for example, comprise one or more parameters relating to a convolution kernel of the image reconstruction algorithm, a parameter relating to a slice thickness, or the like and combinations thereof.

The acquisition parameter set can, for example, comprise one or more parameters relating to radiation during the acquisition of the respective acquisition data set, one or more parameters relating to a pitch and/or a movement of a bearing plate for bearing a patient relative to a radiation source during the acquisition of the respective acquisition data set, one or more parameters relating to a detector during the acquisition of the respective acquisition data set, one or more parameters of an imaging protocol or the like and combinations thereof. Parameters relating to the radiation during the acquisition of the respective projection data set can, in particular, be parameters relating to an X-ray tube voltage, an X-ray tube current, a collimator, an acquisition spectrum and/or a multispectral acquisition mode. Parameters relating to a detector during the acquisition of the respective projection data set can, in particular in the case of a quantum-counting detector, be parameters relating to an energy threshold value and/or an assignment of detector elements to detector units. Detector units to which a plurality of detector elements is assigned are also known to the person skilled in the art for example under the name macro pixels, for example. A parameter relating to the assignment of detector elements to detector units can, for example, be a relative resolution of detector units compared to detector elements.

The injection parameter set can, for example, comprise one or more parameters of an injection protocol. The injection parameter set can, for example, comprise parameters relating to volume, concentration, osmolarity, viscosity, flow rate, injection position, an injection time point and/or time delay, wherein these parameters can, in each case, relate to a contrast medium and/or a saline bolus.

The patient parameter set can, for example, comprise parameters relating to the gender of the patient, the weight of the patient, the height of the patient and/or the age of the patient. The patient parameter set can, for example, be provided with the aid of an electronic medical record ("EMR—electronic medical record", "EHR—electronic health record"). The external image parameter set can, for example, comprise parameters determined based on an image of the exterior of the patient and/or the exterior of the medical imaging device. The image of the exterior of the patient can, for example, be recorded via a camera. The camera can, for example, be an optical camera, an infrared camera, a 2D camera, a 3D camera, a camera integrated in smart glasses worn by a user, or the like or combinations thereof. It is in particular possible to determine parameters of the patient parameter set based on parameters of the external image parameter set. It is in particular possible for one or more parameters of the acquisition parameter set, the injection parameter set, the image reconstruction parameter set and/or the image reconstruction parameter set to be selected patient-specifically and/or based on the patient parameter set and/or the external image parameter set.

The optimal region for the at least one examination parameter of the examination parameter set can, for example, be determined in that the acquisition data sets determined are those which, compared to other acquisition data sets, provide more information and/or more precise information for the optimization of the image reconstruction algorithm based on the first machine learning algorithm and/or for the optimization of the image processing algorithm based on the second machine learning algorithm. The optimal region for the at least one examination parameter can be determined based on the examination parameter sets assigned to acquisition data sets obtained in this way. It is in particular possible to adapt imaging protocols in order to provide acquisition data sets with a greater and/or more accurate information content and/or to avoid acquisition data sets with a lower and/or less accurate information content. It is, for example, possible for a position of an examination region to be selected such that regions of the patient for which the acquisition data only have a low or inaccurate information content with respect to the examination result to be determined are not irradiated. Alternatively and/or additionally, this enables the acquisition spectra and/or acquisition energies to be optimized. This, for example, enables a region to be determined for the at least one examination parameter of the examination parameter set, wherein the region is in particular optimized such that an image processing result with the greatest possible quality can be determined with the lowest possible radiation dose.

At least one embodiment of the invention enables an improvement to the quality of the image processing result and hence an improvement to the quality of an examination result that can be determined based on the image processing result. Hence, at least one embodiment of the invention enables better diagnoses, predictions and/or recommendations from clinical applications and hence better results of clinical processes. With the solution according to at least one embodiment of the invention, the diagnostic quality of the image reconstruction algorithm and/or of the image processing result can in particular be determined by way of a metric that can be determined by an analytical device. The solution according to at least one embodiment of the invention can be used advantageously in many clinical applications. Particular advantages can, for example, be achieved with clinical studies in which quantitatively comparable patient-specific or subject-specific results can be obtained for a large number of patients or subjects. It is in particular advantageously possible for the solution according to at least one embodiment of the invention to be used with lung cancer screening.

It is further possible for the evaluation of the diagnostic quality of the data processing chain comprising the image reconstruction algorithm and the image processing algorithm, inter alia also to refer to the result of any subsequent therapy. Optionally, the solution according to at least one embodiment of the invention enables user preferences to be taken into account. The user can be one person, for example a radiologist, or a group, for example a group of radiologists working in the same hospital or for the same hospital operator. For example, if a user prefers images in a specific embodiment that is typical of a given manufacturer of the medical device, it is possible, during the optimization of the image reconstruction algorithm and/or the image processing algorithm, for training data sets assigned to the given manufacturer of the medical device to be taken into account with a higher weighting.

In the context of this application, a machine learning algorithm should in particular be understood to mean an algorithm embodied for machine learning. A machine learning algorithm can, for example, be implemented with the aid of decision trees, mathematical functions and/or general programming languages. The machine learning algorithm can, for example, be embodied for supervised learning or unsupervised learning. The machine learning algorithm can, for example, be embodied for deep learning and/or for reinforcement learning and/or for marginal space learning. In particular with supervised learning, it is possible to use a function class based, for example, on decision trees, a random forest, logistic regression, a support vector machine, an artificial neural network, a kernel method, Bayes classifiers or the like or combinations thereof. Possible implementations of the machine learning algorithm can, for example, make use of artificial intelligence. Alternatively or additionally to the first machine learning algorithm and/or the second machine learning algorithm, it is possible to use one or more rule-based algorithms. The optimization can be performed using optimization methods known to the person skilled in the art. In particular during the optimization, calculations can, for example, be performed via a processor system. The processor system can, for example, comprise one or more graphics processors.

One or more parameters of the optimized image reconstruction parameter set, the optimized image reconstruction parameter set and/or the optimal region for the at least one examination parameter of the examination parameter set can, for example, be sent to a smartphone application and/or stored by the smartphone application. Alternatively or additionally, these parameters can be output to a control device of a medical imaging device and/or be stored in the control device of the medical imaging device, in particular such that they are available for subsequent examinations by way of the medical imaging device. Alternatively or additionally, these parameters can be stored in a cloud and/or as part of a database for joint use of imaging protocols by a plurality of users and/or on a plurality of medical imaging devices.

The data processing system can, for example, comprise one or more components in the form of hardware and/or one or more components in the form of software. The data processing system can, for example, form the data processing unit and/or one or more components of the data processing unit. The data processing system can, for example, be formed at least partially by a cloud computing system. The data processing system can, for example, comprise a cloud computing system, a computer network, a computer, a tablet computer, a smartphone or the like or combinations thereof. The hardware can, for example, interact with software and/or be configurable by way of software. The software can, for example, be executed by way of the hardware. The hardware can, for example, be a storage system, an FPGA system (field-programmable gate array), an ASIC system (application-specific integrated circuit), a microcontroller system, a processor system and combinations thereof. The processor system can, for example, comprise a microprocessor and/or a plurality of interacting microprocessors.

A data transfer between components of the data processing system can, for example, take place in each case by way of a suitable data transfer interface. The data transfer interface for data transfer to and/or from a component of the data processing system can be implemented at least partially in the form of software and/or at least partially in the form of hardware. The data transfer interface can, for example, be embodied to store data in, and/or to load data from, a region of the storage system, wherein one or more components of the data processing system are able to access this region of the storage system.

The computer program can be loaded into the storage system of the data processing system and executed by the processor system of the data processing system. The data processing system can, for example, by way of the computer program, be embodied such that the data processing system is able to carry out the steps of a method according to one of the embodiments disclosed in the description and/or in the claims when the computer program is executed by the data processing system.

The computer program product can, for example, be the computer program or, in addition to the computer program, comprise at least one additional component. The at least one additional component of the computer program product can be embodied as hardware and/or software. The computer program product can, for example, comprise a storage medium on which at least a part of the computer program product is stored and/or a key for the authentication of a user of the computer program product, in particular in the form of a dongle. The computer program product and/or the computer program can for example comprise a cloud application program embodied to distribute program sections of the computer program on different processing units, in particular different computers, of a cloud computing system, wherein each of the processing units is embodied to execute one or more program sections of the computer program.

The computer-readable medium can, for example, be used to store the computer program product according to one of the embodiments disclosed in the description and/or in the claims and/or the computer program according to one of the embodiments disclosed in the description and/or in the claims. The computer-readable medium can, for example, be a memory stick, a hard disk or another type of data medium, which can in particular be connected detachably to the data processing system or permanently integrated in the data processing system. The computer-readable medium can, for example, form a region of the storage system of the data processing system.

The medical imaging device can, for example, be selected from the imaging modality group including an X-ray device, a C-arm X-ray device, a computed tomography device (CT device), a molecular imaging device (MI device), a single photon emission computed tomography device (SPECT device), a positron emission tomography device (PET device), a magnetic resonance imaging device (MRI device) and combinations thereof (in particular PET-CT devices, PET-MR devices). The medical imaging device can further comprise a combination of an imaging modality selected, for example, from the imaging modality group and an irradiation modality. Herein, the irradiation modality can, for example, comprise an irradiation unit for therapeutic irradiation. Without restricting the general concept of the invention, some of the embodiments are explained using the example of a computed tomography device.

According to one embodiment of the invention, the medical imaging device comprises an acquisition unit embodied for the acquisition of the acquisition data. It is in particular possible for the acquisition unit to comprise a radiation source and a radiation detector. One embodiment of the invention provides that the radiation source is embodied for the emission and/or excitation of radiation, in particular electromagnetic radiation, and/or that the radiation detector is embodied for the detection of radiation, in particular electromagnetic radiation. The radiation can, for example, travel from the radiation source to a region to be imaged and/or, after interaction with the region to be imaged, to the radiation detector. During interaction with the region to be imaged, the radiation is modified and hence becomes a carrier of information relating to the region to be imaged. During the interaction of the radiation with the detector, this information is acquired in the form of acquisition data.

In particular in the case of a computed tomography device and a C-arm X-ray device, the acquisition data set can be a projection data set, the acquisition unit a projection data acquisition unit, the radiation source an X-ray source and the radiation detector an X-ray detector. The X-ray detector can, in particular, be a quantum-counting and/or energy-resolving X-ray detector. A projection data set can, in particular, be understood to be a computed tomography projection data set, for example a sinogram. In particular in the case of a magnetic resonance imaging device, the acquisition data set can be a k-space data set, the acquisition unit a k-space data acquisition unit, the radiation source a first radio frequency antenna unit and the radiation detector the first radio frequency antenna unit and/or a second radio frequency antenna unit.

The gantry of a medical imaging device typically comprises a supporting structure on which in particular components of the acquisition unit, in particular the radiation source and/or the radiation detector are arranged. The supporting structure of the gantry is typically rigid enough and strong enough for the components of the acquisition unit to be arranged relative to one another and relative to a region to be imaged in a geometry that is sufficiently defined for the imaging. In the case of a computed tomography device, the gantry typically comprises a support frame and a rotor can be mounted rotatably relative to the support frame, wherein the radiation source and the radiation detector are arranged on the rotor. The gantry can optionally comprise a tilting frame mounted tiltably relative to the support frame, wherein the rotor is arranged on the tilting frame.

Within the context of embodiments of the invention, features described with respect to different embodiments of the invention and/or different claim categories (method, device, system etc.) can be combined to form further embodiments of the invention. In other words, the substantive claims can also be developed with the features described or claimed in connection with a method. Herein, functional features of a method can be performed by correspondingly embodied substantive components. In addition to the embodiments of the invention expressly described in this application, numerous further embodiments of the invention are conceivable at which the person skilled in the art can arrive without departing from the scope of the invention as specified in the claims.

The use the indefinite article "a" or "an" does not preclude the possibility of the features in question also being present on a multiple basis. The use of the expression "comprise" does not preclude the possibility of the terms being linked by way of the expression "comprise" being identical. For example, the medical imaging device comprises the medical imaging device. The use of the expression "unit" does not preclude the possibility of the subject matter to which the expression "unit" refers comprising a plurality of components that are spatially separate from one another.

In the context of the present invention, the use of ordinal numbers (first, second, third etc.) in the description of features is primarily for better distinction of those features described using ordinal numbers. The absence of a feature described by a combination of a given ordinal number and a term does not preclude the possibility of a feature being present that is also described by a combination of an ordinal number following the given ordinal number and the term.

In the context of the present invention, the expression "based on" can in particular be understood as meaning "using". In particular, wording according to which a first feature is created based on a second feature (alternatively: ascertained, determined etc.) does not preclude the possibility of the first feature being created based on a third feature (alternatively: ascertained, determined etc.).

FIG. 1 shows a flow diagram of a method for optimizing an image reconstruction algorithm according to one embodiment of the invention, wherein the method comprises the following steps:

provision PT of a set of training data sets, wherein each training data set in each case comprises an acquisition data set, generation GI1 in each case of a first medical image for each training data set of at least one first subset of the set of training data sets by way of the image reconstruction algorithm based on the respective acquisition data set, determination DR1 in each case of an image processing result for each of the first medical images by way of an image processing algorithm based on the respective first medical image, determination DX1 in each case of image processing information for each of the first medical images relating to the quality of the respective image processing result based on the respective image processing result, and optimization OR of the image reconstruction algorithm based on a first machine learning algorithm, the at least one first subset of the set of training data sets and the image processing information for the first medical images.

Figure 2:
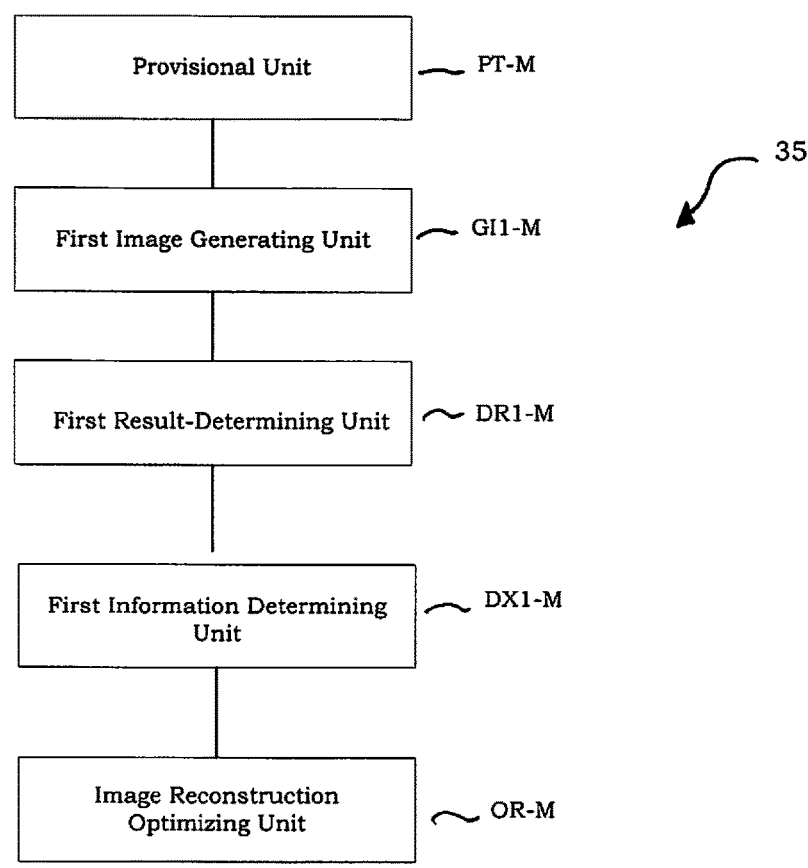
FIG. 2 shows a schematic depiction of a data processing unit for optimizing an image reconstruction algorithm according to a further embodiment of the invention.

FIG. 2 shows a schematic depiction of a data processing unit 35 for optimizing an image reconstruction algorithm according to a further embodiment of the invention comprising a provisioning unit PT-M, a first image-generating unit GI1-M, a first result-determining unit DR1-M, a first information-determining unit DX1-M and an image reconstruction-optimizing unit OR-M.

Figure 3:
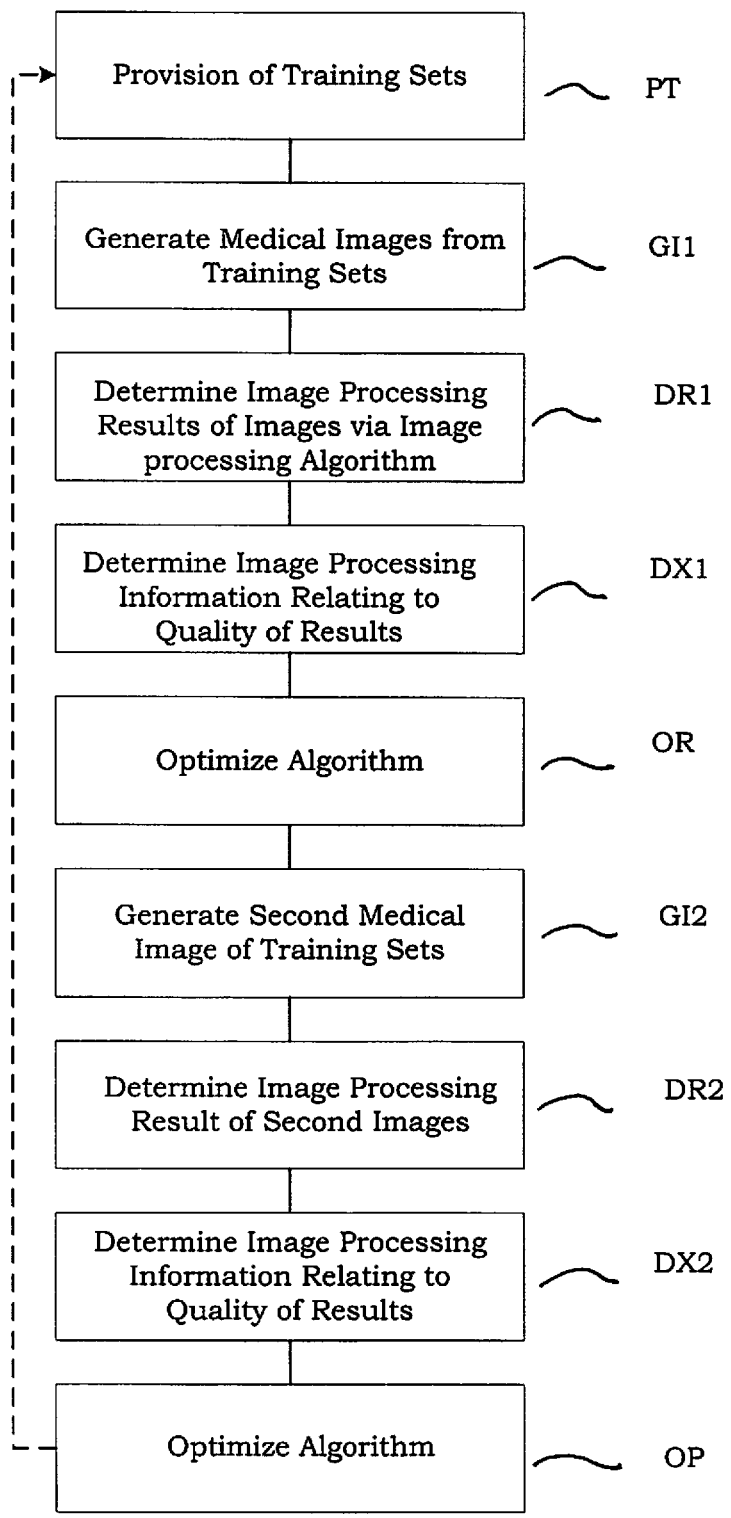
FIG. 3 shows a flow diagram of a method for optimizing an image reconstruction algorithm and an image processing algorithm according to a further embodiment of the invention.

FIG. 3 shows a flow diagram of a method for optimizing an image reconstruction algorithm and an image processing algorithm according to a further embodiment of the invention, wherein, additionally to the steps depicted in FIG. 1, the method comprises the following steps:

generation GI2 in each case of a second medical image for each training data set of at least one second subset of the set of training data sets by way of the optimized image reconstruction algorithm based on the respective acquisition data set, determination DR2 in each case of an image processing result for each of the second medical images by way of the image processing algorithm based on the respective second medical image, determination DX2 in each case of image processing information for each of the second medical images relating to the quality of the respective image processing result based on the respective image processing result, and optimization OP of the image processing algorithm based on a second machine learning algorithm, the second medical images and the image processing information for the second medical images.

The dashed arrow indicates that the steps depicted in FIG. 3 can be repeated in a further iteration step of a plurality of iteration steps.

Figure 4:
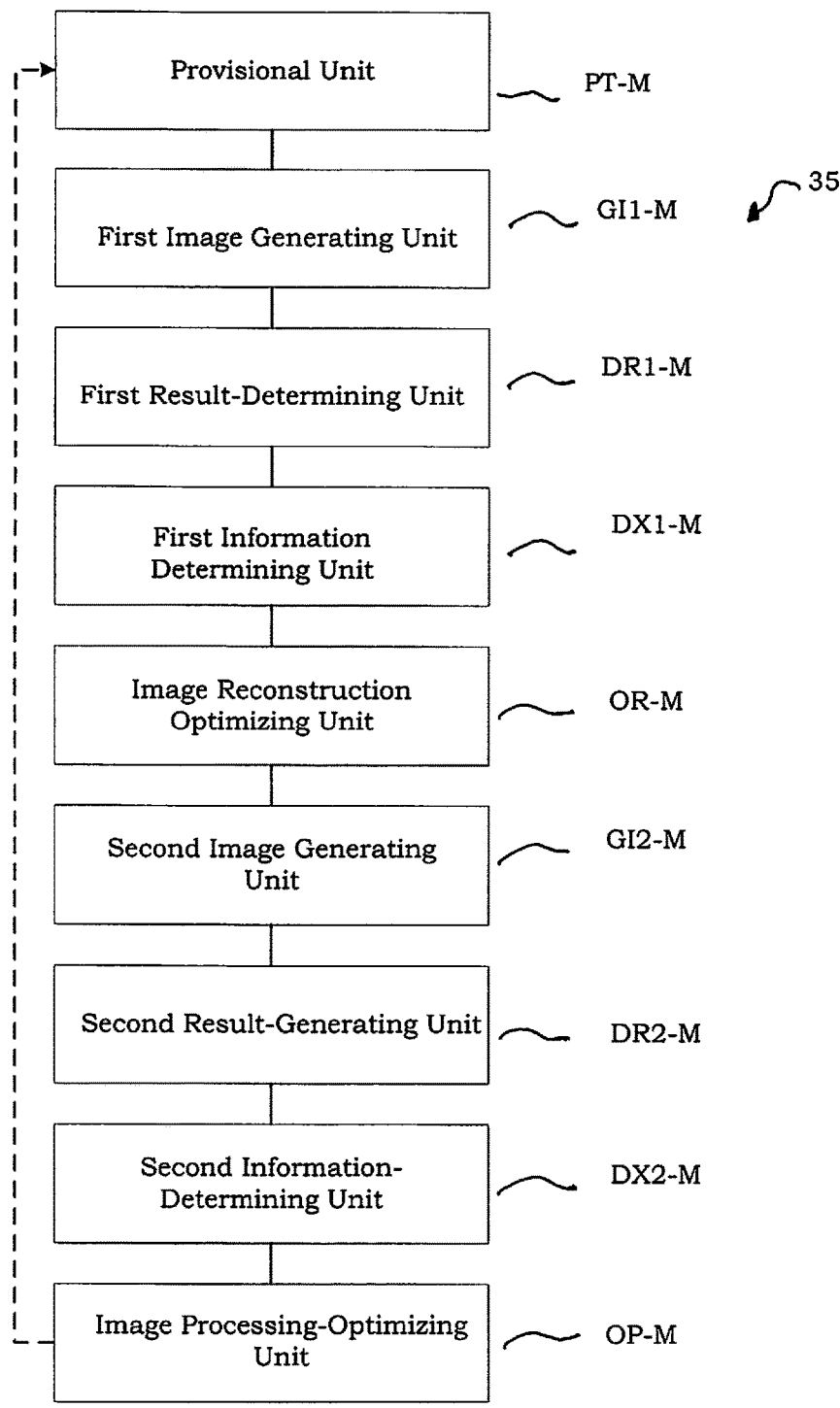
FIG. 4 shows a schematic depiction of a data processing unit for optimizing an image reconstruction algorithm and an image processing algorithm according to a further embodiment of the invention.

FIG. 4 shows a schematic depiction of a data processing unit 35 for optimizing an image reconstruction algorithm and an image processing algorithm according to a further embodiment of the invention further comprising a second image-generating unit GI2-M, a second result-determining unit DR2-M, a second information-determining unit DX2-M and an image processing-optimizing unit OP-M.

The dashed arrow indicates that the steps depicted in FIG. 3 can be repeated in a further iteration step of a plurality of iteration steps by way of the components of the data processing unit 35 depicted in FIG. 4.

Figure 5:
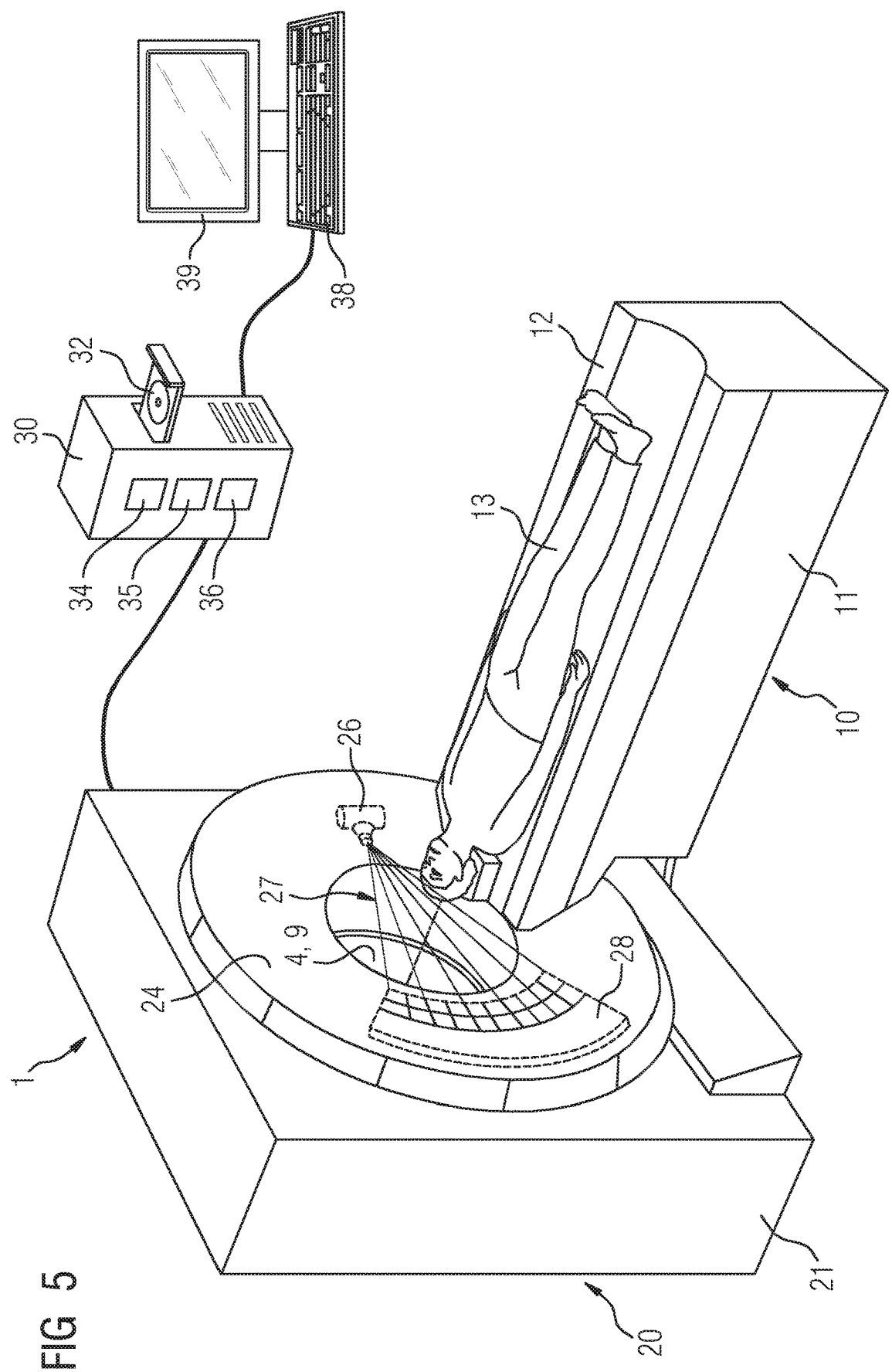
FIG. 5 shows a schematic depiction of a medical imaging device according to a further embodiment of the invention.

FIG. 5 shows a schematic depiction of a medical imaging device according to a further embodiment of the invention. Without restricting the general concept of the invention, this shows a computed tomography device for the medical imaging device 1. The medical imaging device 1 comprises the gantry 20, the tunnel-shaped opening 9, the patient-bearing device 10 and the control device 30.

The gantry 20 comprises the stationary support frame 21, the tilting frame 22 and the rotor 24. The rotor 24 is arranged on the tilting frame 22 rotatably about an axis of rotation relative to the tilting frame 21 via a rotating support device.

The patient 13 can be introduced into the tunnel-shaped opening 9. The tunnel-shaped opening 9 contains the acquisition region 4. A region of the patient 13 to be depicted can be positioned in the acquisition region 4 such that the radiation 27 can travel from the radiation source 26 to the region to be imaged and, following interaction with the region to be imaged, travel to the radiation detector 28.

The patient-bearing device 10 comprises the bearing base 11 and the bearing plate 12 for bearing the patient 13. The bearing plate 12 is arranged movably relative to the bearing base 11 on the bearing base 11 such that the bearing plate 12 can be introduced into the acquisition region 4 in a longitudinal direction of the bearing plate 12.

The medical imaging device 1 is embodied for the acquisition of acquisition data based on electromagnetic radiation 27. The medical imaging device 1 comprises an acquisition unit. The acquisition unit is a projection data acquisition unit with the radiation source 26, for example an X-ray source, and the detector 28, for example an X-ray detector, in particular an energy-resolving X-ray detector. The radiation source 26 is arranged on the rotor 24 and embodied for the emission of radiation 27, for example X-rays, with radiation quanta 27. The detector 28 is arranged on the rotor 24 and embodied to detect the radiation quanta 27. The radiation quanta 27 can travel from the radiation source 26 to the region of the patient to be imaged 13 and, following interaction with the region to be imaged, strike the detector 28. This enables the acquisition unit to acquire an acquisition data set of the region to be imaged in the form of a projection data set.

The control device 30 is embodied to receive the acquisition data acquired from the acquisition unit. The control device 30 is embodied to control the medical imaging device 1. The control device 30 comprises the data processing unit 35, the computer-readable medium 32 and the processor system 36. The control device 30, in particular the data processing unit 35, is formed by a data processing system, which comprises a computer.

The control device 30 comprises the image reconstruction facility 34. The image reconstruction facility 34 can reconstruct a medical image data set based on an acquisition data set.

The medical imaging device 1 comprises an input device 38 and an output device 39 each of which is connected to the control device 30. The input device 38 is embodied to input control information, for example image reconstruction parameters, examination parameters, or the like. The output device 39 is in particular embodied to output control information, images and/or tones.

Figure 6:
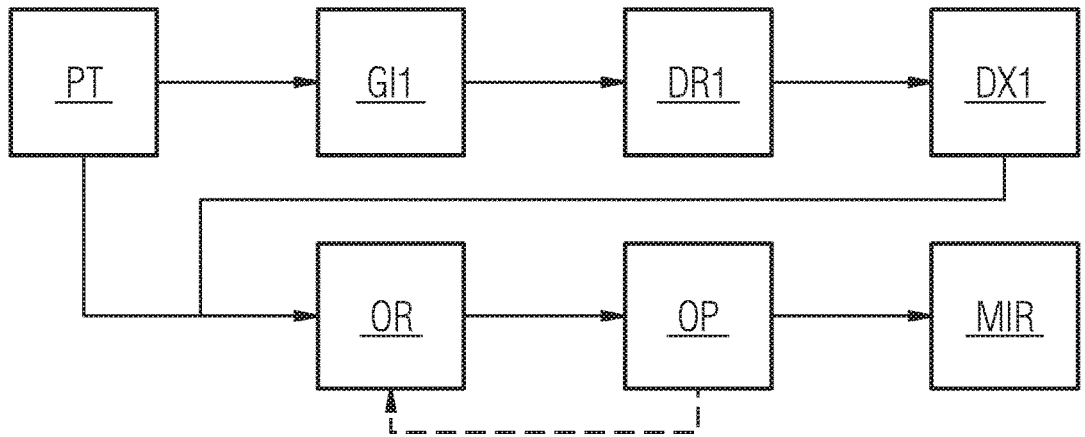
FIG. 6 shows a flow diagram of a method for optimizing an image reconstruction algorithm and an image processing algorithm according to a further embodiment of the invention.

FIG. 6 shows a flow diagram of a method for optimizing an image reconstruction algorithm and an image processing algorithm according to a further embodiment of the invention. As depicted by the dashed arrow, a plurality of iteration steps is performed. Following the last iteration step of the plurality of iteration steps, the optimized image reconstruction algorithm and the optimized image processing algorithm can be output, in particular stored, and/or determined for the determination of an image processing result based on an acquisition data set. In the context of this application, the optimized image reconstruction algorithm and the optimized image processing algorithm are referred to collectively as MetaIR MIR.

Figure 7:
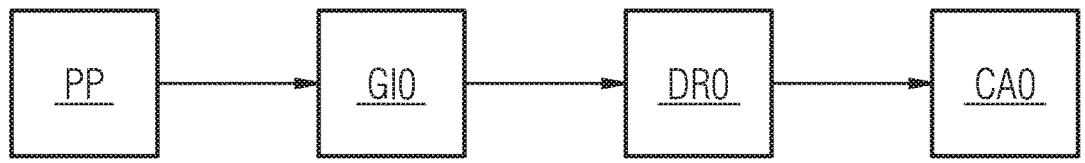
FIG. 7 shows a flow diagram of a conventional method for the determination of an examination result.

FIG. 7 shows a flow diagram of a conventional method for the determination of an examination result. In Step PP, an acquisition data set is provided. In Step GI0, a medical image is generated by way of a conventional image reconstruction algorithm based on the acquisition data set. In Step GR0, an image processing result is determined by way of a conventional image processing algorithm based on the medical image. In Step CA0, an examination result, for example a diagnosis and/or a prediction, based on the image processing result is determined.

Figure 8:
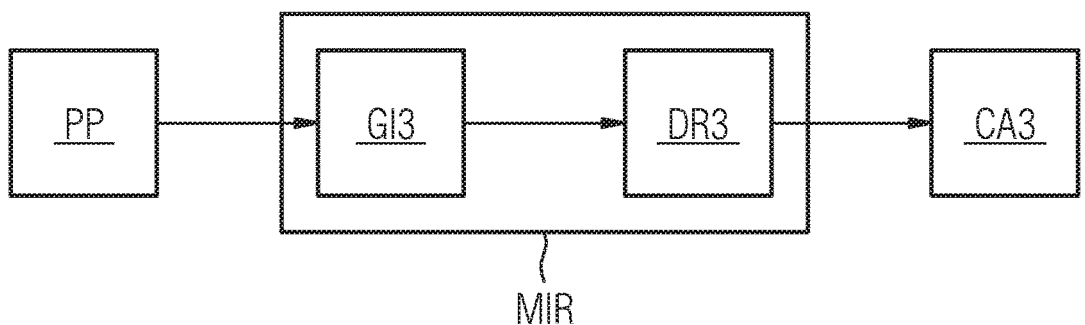
FIG. 8 shows a flow diagram of a method with which an image reconstruction algorithm and an image processing algorithm, which have been optimized in accordance with a method according to one embodiment of the invention, are used for the determination of an image processing result based on an acquisition data set.

FIG. 8 shows a flow diagram of a method with which an image reconstruction algorithm and an image processing algorithm, which have been optimized in accordance with a method according to one embodiment of the invention, are used for the determination of an image processing result based on an acquisition data set. In Step PP, an acquisition data set is provided. In Step GI3, a medical image is generated by way of the optimized image reconstruction algorithm based on the acquisition data set. In Step GR3, an image processing result is determined by way of the optimized image processing algorithm based on the medical image. In Step CA3, an examination result, for example a diagnosis and/or a prediction, is determined based on the image processing result.

The acquisition data sets can in particular be sinograms S(x). A medical image I_IT(x) can, for example, be generated based on an acquisition data set by way of the image reconstruction algorithm in that, first, an initial image I_f(x) is generated by way of filtered back projection FBP and/or by way of another, in particular non-iterative, reconstruction method and then an iterative reconstruction method IR based on the initial image I_f(x) is carried out:

$$I\_f(x)=FBP(S(x)),$$

$$I\_IT(x)=IR(I\_IT-1(x),I\_f(x)).$$

The reference image processing results can in particular be binary maps I_MASK(x). For example, I_MASK(x) can assign the value 1 to image points assigned to a structure in the medical image and the value 0 to image points assigned to a background of a structure in the medical image.

The image processing algorithm can, for example, be optimized based on a set of training pairs TRAINING, wherein each training pair of the set of training pairs comprises a medical image and a corresponding reference image processing result:

$$TRAINING=\{[I\_MASK(x),I\_IT(x)]\_1, \ldots ,[I\_MASK(x),I\_IT(x)]\_N\}.$$

Herein, N is the number of training pairs in the set of training pairs.

According to one embodiment of the invention, the image processing algorithm p(I_IT(x)|BETA) is embodied for the segmentation of a structure in the medical image. Herein, image points can be assigned by way of the image processing algorithm to a structure in the medical image and/or a background of the structure in the medical image. For example, the image processing algorithm p can assign the value 1 to image points assigned by the image processing algorithm to a structure in the medical image and the value 0 to image points assigned by the image processing algorithm to a background of structure in the medical image. This assignment can, in particular, depend upon the medical image and the image reconstruction parameter set BETA. The image processing information relating to the quality of the respective image processing result, can, for example, be a matrix norm and/or a vector norm of a differential image, which can be determined by subtracting the binary map from the image processing result. In the formula for KPI2, the parentheses | . . . | indicate a matrix norm, for example a matrix norm corresponding to the Euclidean norm. Optimization: Least Squares The second item of cumulated image processing information KPI2, which is determined based on the image processing information, can, for example, be the sum of the values of the image processing information.

$$KPI2 = \sum_{i=1}^{N} \|p(I\_IT_i(x)|BETA) - I\_MASK_i(x)\|$$

The image processing algorithm p can, for example, be optimized in that an optimized image reconstruction parameter set BETA of the image processing algorithm is determined. The optimized image reconstruction parameter set BETA can, for example, be determined based on the second machine learning algorithm such that the second item of cumulated image processing information KPI2 is minimized. This enables the image processing algorithm p(I_IT(x)|BETA) to be determined by way of a method for machine learning, which can, for example, be based on boosting or deep neural networks.

According to one embodiment of the invention, the image reconstruction algorithm can comprise a plurality of reconstruction-iteration steps. It is in particular possible for an intermediate image based on the input of the reconstruction-iteration step to be generated for each reconstruction-iteration step of the plurality of reconstruction-iteration steps. It is in particular possible for the input of the first reconstruction-iteration step of the plurality of reconstruction-iteration steps to comprise an initial image. It is in particular possible for the input of each further reconstruction-iteration step of the plurality of reconstruction-iteration steps to comprise an a intermediate image, which was generated in the preceding reconstruction-iteration step, and an image processing result, which was determined based on the intermediate image generated in the preceding reconstruction-iteration step by way of an image processing algorithm. It is in particular possible for the image reconstruction algorithm to comprise an image reconstruction parameter set ALPHA, which in particular determines the incorporation of the image processing result in the image reconstruction algorithm:

$$I\_IT\_M(x)=IR(I\_IT\_M-1(x),I\_f(X),p(I\_IT\_M-1(x)|BETA),ALPHA).$$

The image reconstruction algorithm can, for example, be optimized based on a set of training pairs, wherein each training pair of the set of training pairs comprises an acquisition data set and a corresponding reference image processing result. The image reconstruction algorithm can be optimized in that an optimized image reconstruction parameter set ALPHA of the image reconstruction algorithm is determined. The optimized image reconstruction parameter set ALPHA can, for example, be determined based on the first machine learning algorithm such that the first item of cumulated image processing information KPI1 is minimized.

$$KPI1 = \sum_{i=1}^{N} \|p(I\_IT\_M_i(x)|BETA, ALPHA) - I\_MASK_i(x)\|$$

It is in particular possible, during the optimization of the image reconstruction algorithm, to incorporate the reference image processing result I_MASK(x) in the image reconstruction algorithm in place of the image processing result p(I_IT_M−1(x)|BETA):

$$I\_IT\_IR(x)=IR(I\_IT\_M-1(x),I\_f(X),I\_MASK(x),ALPHA).$$

When the image reconstruction algorithm and the image processing algorithm have been optimized, an optimized medical image can be generated as follows:

$$I\_IT\_M(x)=IR(I\_IT\_M-1(x),I\_f(X),p(I\_IT\_M-1(x)|BETA),ALPHA).$$

It is in particular possible for an image processing result determined based on the optimized medical image by way of the image processing algorithm to be of a much higher quality than an image processing result determined based on a medical image generated in the conventional manner by way of the image processing algorithm.

According to one embodiment of the invention, the image processing algorithm comprises a first algorithm p(I_IT(x) |BETA) for segmenting a structure in the medical image and a second algorithm p_clinical(I_HIGH(y), THETA) for the determination of a spatially resolved distribution of a physiological parameter in the structure. Herein, the coordinate y can indicate a position with respect to the structure. I_HIGH (y) can, for example, be understood to be a higher-ranking descriptor for the structure:

I_HIGH(y)=HIGHFUNCTION(I_IT(x),p(I_IT(x) |BETA)).

It is in particular possible for the image processing algorithm to comprise a third algorithm for the determination of the higher-ranking descriptor I_HIGH(y) based on the medical image and the segmentation result of the first algorithm. It is in particular possible to use the higher-ranking descriptor I_HIGH(y) to assign one or more descriptor values to a position y defined with respect to the structure. The structure can, for example, be an anatomical structure, in particular a coronary vessel. The position y can, for example, be a position along the central lines of the coronary vessel. The physiological parameter can, for example, be an FFR value. It is in particular possible for the second algorithm p_clinical to assign a value, for example from the interval [0, 1], which is a measure for the amount of the FFR value at the respective position, to positions along the central line of the coronary vessel. It is in particular possible for the reference image processing result to comprise a reference distribution I_clinical(y) of the physiological parameter. The second algorithm p_clinical can, for example, be optimized in that an optimized image reconstruction parameter set THETA of the image processing algorithm is determined. The optimized image reconstruction parameter set THETA can, for example, be determined based on the second machine learning algorithm such that the second item of cumulated image processing information KPI2 is minimized.

$$KPI2 = \sum_{i=1}^{N} \|p\_clinical(I\_HIGH_i(y)|THETA) - I\_clinical_i^r(y)\|$$

When the image reconstruction algorithm and the image processing algorithm have been optimized, an optimized medical image can be generated as follows:

I_IT_C(x)=IR(I_IT_C-1(x),I_f(X),p_clinical(I_IT_C-1(x)|THETA),ALPHA).

Figure 9:
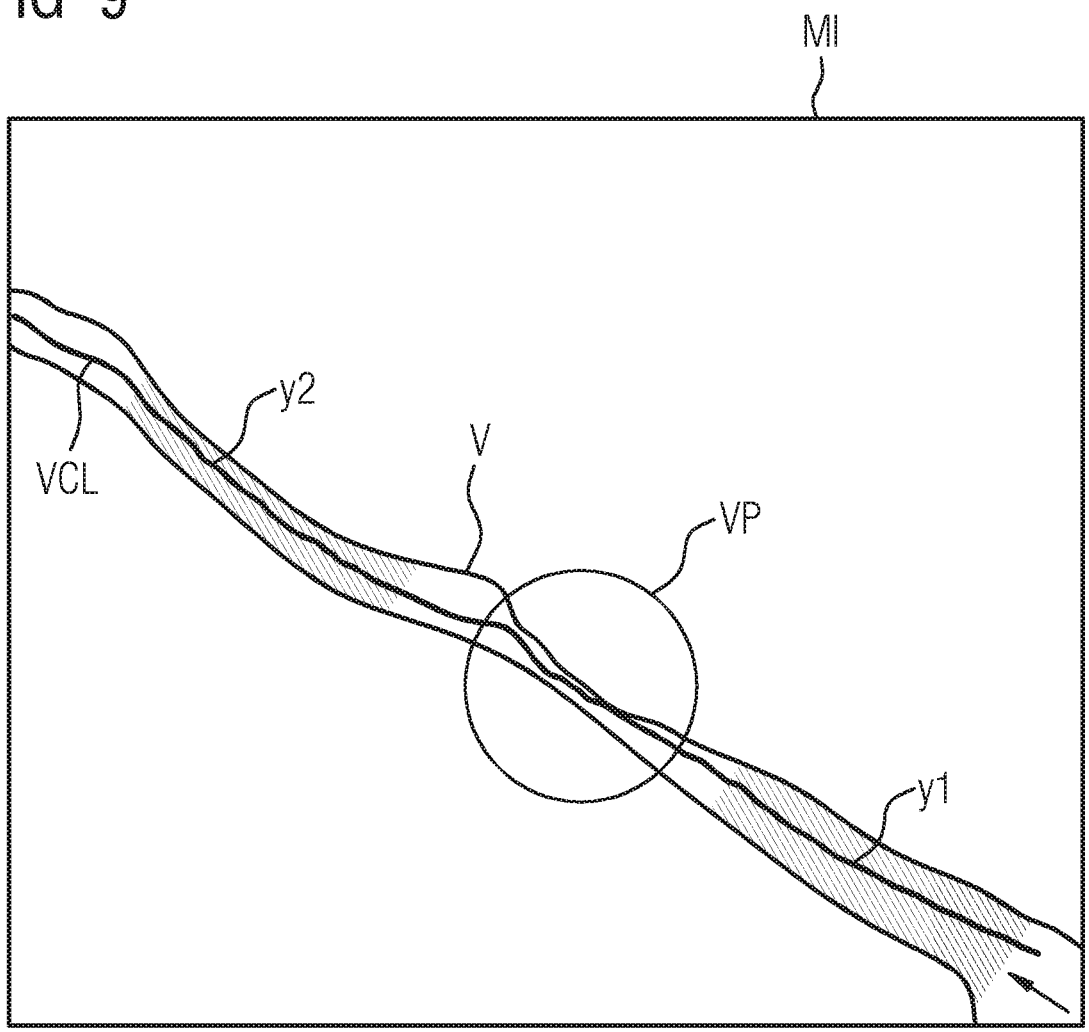
FIG. 9 shows a schematic depiction of a medical image in which a coronary vessel is depicted by way of example for a segmentable structure.

FIG. 9 shows a schematic depiction of a medical image MI in which a coronary vessel V is depicted by way of example for a segmentable structure. VCL indicates a central line of the coronary vessel V. The arrow indicates a direction of the blood flow through the coronary vessel. In the region VP, there is a stenosis of the coronary vessel. The positions y1 and y2 indicate different positions along the central line VCL, wherein y1 is located before the stenosis with respect to the direction of blood flow and wherein y2 is located behind the stenosis with respect to the direction of blood flow. A comparison of image processing results in the form of calculated FFR values at the positions y1 and y enables information to be determined with respect to the stenosis.

The patent claims of the application are formulation proposals without prejudice for obtaining more extensive patent protection. The applicant reserves the right to claim even further combinations of features previously disclosed only in the description and/or drawings.

References back that are used in dependent claims indicate the further embodiment of the subject matter of the main claim by way of the features of the respective dependent claim; they should not be understood as dispensing with obtaining independent protection of the subject matter for the combinations of features in the referred-back dependent claims. Furthermore, with regard to interpreting the claims, where a feature is concretized in more specific detail in a subordinate claim, it should be assumed that such a restriction is not present in the respective preceding claims.

Since the subject matter of the dependent claims in relation to the prior art on the priority date may form separate and independent inventions, the applicant reserves the right to make them the subject matter of independent claims or divisional declarations. They may furthermore also contain independent inventions which have a configuration that is independent of the subject matters of the preceding dependent claims.

None of the elements recited in the claims are intended to be a means-plus-function element within the meaning of 35 U.S.C. § 112(f) unless an element is expressly recited using the phrase "means for" or, in the case of a method claim, using the phrases "operation for" or "step for."

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

BIBLIOGRAPHY

[1] 'Machine learning: Trends, perspectives, and prospects' Jordan, Mitchell, Science 2015 (349) 255, the entire contents of which are hereby incorporated herein by reference.
[2] 'Computer-aided classification of lung nodules on computed tomography images via deep learning technique' Hua et al., Onco Targets and Therapy 2015 (8) 2015, the entire contents of which are hereby incorporated herein by reference.
[3] 'Pixel-Based Machine Learning in Medical Imaging' Suzuki, International Journal of Biomedical Imaging 2012, the entire contents of which are hereby incorporated herein by reference.
[4] 'Machine Learning for Detection and Diagnosis of Disease' Annual Review Biomedical Engineering 2006 (8) 1, the entire contents of which are hereby incorporated herein by reference.

What is claimed is:

1. A method for adjusting an image reconstruction algorithm, the method comprising:
provisioning a set of training data sets, each training data set among the set of training data sets including an acquisition data set;
generating a first medical image for each respective training data set among at least one first subset of the set of training data sets using the image reconstruction algorithm and based on a respective acquisition data set;
determining an image processing result for each respective first medical image using an image processing algorithm based on the respective first medical image;

determining, for each of the respective first medical images, image processing information based on the respective image processing result, the image processing information corresponding to a quality of the respective image processing result; and adjusting the image reconstruction algorithm based on (i) a first machine learning algorithm, (ii) the at least one first subset of the set of training data sets, and (iii) the image processing information for the respective first medical images.

2. The method of claim 1, wherein the image processing result corresponds to medical information.

3. The method of claim 1, wherein the image processing information corresponds to at least one of a measure of an inaccuracy of the image processing result or a measure of a deviation of the image processing result from a respective reference image processing result.

4. The method of claim 1, wherein the image processing information is determined based on a Dice coefficient.

5. The method of claim 1, wherein the training data sets each include an examination parameter set selected from the group including at least one of an acquisition parameter set, an injection parameter set, a patient parameter set, or an external image parameter set.

6. The method of claim 5, wherein at least one of,
at least one of the image reconstruction algorithm or the image processing algorithm is adjusted based on the examination parameter set, or
at least one of during the adjustment of the image reconstruction algorithm or during the adjustment of the image processing algorithm, the method includes determining an adjusted region for at least one examination parameter of the examination parameter set based on (i) the first machine learning algorithm, (ii) the set of training data sets, and (iii) the image processing information.

7. A non-transitory computer program product, directly loadable into a memory facility of a data processing system, the non-transitory computer program product including,
program sections for carrying out the method of claim 1 in response to the computer program being executed by the data processing system.

8. A non-transitory computer-readable medium on which program sections, readable-in and executable by a data processing system, are stored to carry out the method of claim 1 in response to the program sections being executed by the data processing system.

9. A method, comprising:
generating a medical image by using the image reconstruction algorithm adjusted in accordance with the method of claim 1.

10. The method of claim 1, wherein at least one of,
the image processing algorithm includes an algorithm to identify a structure in a patient based on the respective first medical image; or
the image processing algorithm includes an algorithm for the determining a physiological parameter in a patient based on the respective first medical image.

11. The method of claim 1,
wherein each respective training data set of the set of training data sets further comprises a reference image processing result, and
wherein the image processing information associated with each of the respective first medical images is determined based on (i) the respective image processing result and (ii) the respective reference image processing result.

12. The method of claim 1, wherein at least one of,
the image processing algorithm includes an algorithm for segmenting a structure in the first medical image, or
each respective training data set of the set of training data sets further comprises a reference image processing result, and the reference image processing result corresponds to an assignment of image data points of the first medical image to a structure in the first medical image.

13. The method of claim 1, wherein each respective training data set of the set of training data sets further comprises a reference image processing result and the respective reference image processing result includes a map with which image data points of the respective first medical image are assignable to a structure in the respective first medical image.

14. The method of claim 1, wherein the image reconstruction algorithm is adjusted based on a first item of accumulated image processing information, the first item of accumulated image processing information being determined based on the image processing information for the respective first medical images.

15. The method of claim 1, wherein at least one of,
the image reconstruction algorithm is adjusted by determining an at least one image reconstruction parameter set of the image reconstruction algorithm; or
the image processing algorithm is adjusted by determining at least one image reconstruction parameter set of the image processing algorithm.

16. A method for adjusting an image reconstruction algorithm and an image processing algorithm, the method comprising:
provisioning a set of training data sets, each respective training data set among the training data sets including an acquisition data set;
generating a plurality of first medical images for training data sets among at least one first subset of the set of training data sets using the image reconstruction algorithm and based on acquisition data sets included in the training data sets among the at least one first subset;
determining a first image processing result for each respective first medical image among the plurality of first medical images using an image processing algorithm based on the respective first medical image;
determining first image processing information for each respective first medical image based on the respective first image processing result, the first image processing information corresponding to a quality of the respective first image processing result;
adjusting the image reconstruction algorithm based on (i) first machine learning algorithm, (ii) the at least one first subset of the set of training data sets, and (iii) the first image processing information;
generating a plurality of second medical images for training data sets among at least one second subset of the set of training data sets using the adjusted image reconstruction algorithm and based on acquisition data sets included in the training data sets among the at least one second subset;
determining a second image processing result for each respective second medical image using the image processing algorithm based on the respective second medical image;
determining second image processing information for each respective second medical image based on the respective second image processing result, the second image processing information corresponding to a quality of the respective second image processing result; and adjusting the image processing algorithm based on (i) a second machine learning algorithm, (ii) the plurality of second medical images, and (iii) the second image processing information.

17. The method of claim 16,
wherein at least two iterations of the method are performed,
wherein, in a first iteration of the at least two iterations, all steps of the method are performed,
wherein, with each further iteration of the at least two iterations, the image reconstruction algorithm is further adjusted proceeding from the image reconstruction algorithm adjusted in a preceding iteration based on the image processing algorithm adjusted in the preceding iteration, and
wherein the image processing algorithm is further adjusted proceeding from the image processing algorithm adjusted in the preceding iteration based on the image reconstruction algorithm that was previously further adjusted in the further iteration.

18. The method of claim 17, wherein at least one of the first image processing result or the second image processing result corresponds to medical information.

19. The method of claim 17, wherein at least one of,
the image processing algorithm includes an algorithm for identifying a structure in a patient based on at least one medical image among the plurality of first medical images or the plurality of second medical images, or
the image processing algorithm includes an algorithm for determining a physiological parameter in the patient based on at least one medical image among the plurality of first medical images or the plurality of second medical images.

20. The method of claim 17,
wherein each respective training data set of the set of training data sets further includes a reference image processing result,
wherein at least one of (i) the first image processing information is determined based on at least the respective first image processing result and a corresponding first reference image processing result, or (ii) the second image processing information is determined based on the respective second image processing result and a corresponding second reference image processing result.

21. The method of claim 17, wherein at least one of,
the image processing algorithm includes an algorithm for segmenting a structure in at least one of the first medical image, the medical image being one of a first medical image among the plurality of first medical images or a second medical image among the plurality of second medical images, or
each training data set among the set of training data sets further includes a reference image processing result, and the reference image processing result relates to an assignment of image data points of the a medical image to a structure in the medical image, the medical image being one of a first medical image among the plurality of first medical images or a second medical image among the plurality of second medical images.

22. The method of claim 17, wherein each respective training data set of the set of training data sets further comprises a reference image processing result, wherein the reference image processing result includes, a map with which image data points of a corresponding first medical image are assignable to a structure in the corresponding medical image, the corresponding medical image being a first medical image among the plurality of first medical images or a second medical image among the plurality of second medical images.

23. The method of claim 16, wherein at least one of
the image processing algorithm includes an algorithm for identifying a structure in a patient based on at least one medical image among the plurality of first medical images or the plurality of second medical images; or
the image processing algorithm includes an algorithm for determining a physiological parameter in the patient based on at least one medical image among the plurality of first medical images or the plurality of second medical images.

24. The method of claim 16,
wherein each respective training data set of the set of training data sets further includes a reference image processing result, and
wherein at least one of (i) the first image processing information is determined based on at least the respective first image processing result and a corresponding first reference image processing result, or (ii) the second image processing information is determined based on the respective second image processing result and a corresponding second reference image processing result.

25. The method of claim 16, wherein at least one of,
the image processing algorithm includes an algorithm for segmenting a structure in a medical image, the medical image being one of a first medical image among the plurality of first medical images or a second medical image among the plurality of second medical images, or
each training data set among the set of training data sets further includes a reference image processing result, and the reference image processing result relates to an assignment of image data points of a medical image to a structure in the medical image, the medical image being one of a first medical image among the plurality of first medical images or a second medical image among the plurality of second medical images.

26. The method of claim 16, wherein a training data set among the set of training data sets further includes a reference image processing result, and the reference image processing result includes,
a map with which image data points of a corresponding medical image are assignable to a structure in the corresponding medical image, the corresponding medical image being a first medical image among the plurality of first medical images or a second medical image among the plurality of second medical images.

27. The method of claim 16, wherein at least one of,
the image reconstruction algorithm is adjusted based on a first item of accumulated image processing information, the first item of accumulated image processing information being determined based on the image processing information for the respective first medical images, or
the image processing algorithm is adjusted based on a second item of accumulated image processing information, the second item of accumulated image processing information being determined based on the image processing information for the respective second medical images.

28. The method of claim 16, wherein at least one of,
the image reconstruction algorithm is adjusted by determining at least one image reconstruction parameter set of the image reconstruction algorithm; or
the image processing algorithm is adjusted by determining at least one image reconstruction parameter set of the image processing algorithm.

29. A method, comprising:
determining an image processing result by using the image reconstruction algorithm and an image processing algorithm that are adjusted in accordance with the method of claim 16, the determining based on an acquisition data set, wherein
the acquisition data set is provided,
a medical image is generated using the image reconstruction algorithm, the generating the medical image being based on the acquisition data set, and
the image processing result is determined using the image processing algorithm, the image processing result being based on the generated medical image.

30. The method of claim 16, wherein at least one of the first image processing result or the second image processing result corresponds to medical information.

31. The method of claim 16, wherein the first or second image processing information corresponds to at least one of a measure of an inaccuracy of a corresponding one of the first or second image processing results or a measure of a deviation of the corresponding one of the first or second image processing result from a respective reference image processing result.

32. The method of claim 16, wherein at least one of the first or second image processing information is determined based on a Dice coefficient.

33. The method of claim 16, wherein the training data sets each include an examination parameter set selected from the group including at least one of an acquisition parameter set, an injection parameter set, a patient parameter set, or an external image parameter set.

34. The method of claim 33, wherein at least one of,
at least one of the image reconstruction algorithm or the image processing algorithm is adjusted based on the examination parameter set, or
at least one of during the adjustment of the image reconstruction algorithm or during the adjustment of the image processing algorithm, an adjusted region is determined for at least one examination parameter of the examination parameter set based on (i) the first machine learning algorithm, (ii) the set of training data sets, and (iii) the first image processing information.

35. A non-transitory computer program product, directly loadable into a memory facility of a data processing system, including program sections for carrying out the method of claim 16 in response to the computer program being executed by the data processing system.

36. A non-transitory computer-readable medium on which program sections, readable-in and executable by a data processing system, are stored to carry out the method of claim 16 response to the program sections being executed by the data processing system.

37. A method, comprising:
generating a medical image based on an acquisition data set, using the image reconstruction algorithm adjusted in accordance with the method of claim 16.

38. A processing device comprising:
a memory configured to store computer readable instructions; and
at least one processor configured to execute the computer readable instructions to cause the processing device to
provide a set of training data sets, each training data set among the set of training data sets including an acquisition data set,
generate a first medical image for each respective training data set among at least one first subset of the set of training data sets, using an image reconstruction algorithm and based on the respective acquisition data set,
determine a first image processing result for each respective first medical image using an image processing algorithm based on the respective first medical image
determine image processing information for each respective first medical images quality of the respective image processing result based on the respective first image processing result, the first image processing information corresponding to a quality of the respective first image processing result, and
adjust the image reconstruction algorithm based on (i) a first machine learning algorithm, (ii) the at least one first subset of the set of training data sets, and (iii) the first image processing information.

39. The processing device of claim 38, wherein the memory includes computer readable instructions that, when executed by the processor, cause the processing device to,
generate a plurality of second medical images for training data sets among at least one second subset of the set of training data sets using the adjusted image reconstruction algorithm and based on acquisition data sets included in the training data sets among the at least one second subset,
determine a second image processing result for each respective second medical image using an image processing algorithm based on the respective second medical image,
determine second image processing information for each respective second medical images based on the respective second image processing result, the second image processing information corresponding to a quality of the respective second image processing result; and
adjust the image processing algorithm based on (i) a second machine learning algorithm, (ii) the plurality of second medical images, and (iii) the second image processing information.

40. A medical imaging device comprising:
the processing device of claim 39.

41. A medical imaging device comprising:
the processing device of claim 38.

* * * * *